United States Patent
Kurtin et al.

(10) Patent No.: US 9,971,789 B2
(45) Date of Patent: May 15, 2018

(54) SELECTIVE DISK VOLUME CLONING FOR VIRTUAL DISK CREATION

(71) Applicant: AVAST Software s.r.o., Prague (CZ)

(72) Inventors: Petr Kurtin, Otrokovice (CZ); Luboš Hnaniček, Prague (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 450 days.

(21) Appl. No.: 14/581,494

(22) Filed: Dec. 23, 2014

(65) Prior Publication Data
US 2015/0186060 A1    Jul. 2, 2015

Related U.S. Application Data

(60) Provisional application No. 61/920,999, filed on Dec. 26, 2013.

(51) Int. Cl.
*G06F 17/30* (2006.01)
*G06F 11/14* (2006.01)
*G06F 3/06* (2006.01)
*G06F 9/455* (2018.01)

(52) U.S. Cl.
CPC ...... *G06F 17/30235* (2013.01); *G06F 3/0662* (2013.01); *G06F 3/0665* (2013.01); *G06F 9/45533* (2013.01); *G06F 11/1484* (2013.01)

(58) Field of Classification Search
None
See application file for complete search history.

(56) References Cited

U.S. PATENT DOCUMENTS 9,195,393 B1 *   11/2015   Li .................. G06F 12/0223

\* cited by examiner

*Primary Examiner* — Midys Rojas
(74) *Attorney, Agent, or Firm* — Husch Blackwell LLP (57) ABSTRACT

Systems and methods create virtual disks for access by a virtual machine. The virtual disk can be created from marked folders such that files and folders containing sensitive data or data not necessary for the purpose of a virtual machine using the virtual disk can be omitted from the virtual disk.

22 Claims, 6 Drawing Sheets

SELECTIVE DISK VOLUME CLONING FOR VIRTUAL DISK CREATION

CROSS-REFERENCE TO RELATED APPLICATION

This application claims the benefit of U.S. Provisional Patent Application No. 61/920,999 filed Dec. 26, 2013, the entire disclosure of which is hereby incorporated by reference.

FIELD OF THE INVENTION

This disclosure relates generally to systems and methods for storage management, and more particularly, to selectively cloning portions of a disk volume to create a virtual disk.

BACKGROUND

A virtual machine is software implementation of a computing machine. A virtual machine can be used to divide a single host computer system into multiple virtual machines, where each virtual machine runs a separate instance, or image, of an operating system (OS). A virtual machine is separate, or isolated, from other virtual machines and may also be isolated from hardware available on a host system. For example, instances of virtual machines can have separate file systems, separate users, separate applications, and separate processes. In other ways, however, the instances of the virtual machines are not separate and can share some resources of the host. For example, the instances of the virtual machines can share the memory, processors, network cards, hard drives, and other hardware of the host computer system.

Virtual machines haven proven useful in many environments. For example, virtual machines can be used to provide different operating systems on a computing system. Further, virtual machines can be used to provide a secure environment in which to execute untrusted software or to browse untrusted web sites. The virtual machine in such cases can be isolated from the main file system and hardware of the underlying computing system. Thus any corruption caused by malware or improperly functioning software is limited to the virtual machine.

Virtual machines typically access a virtual disk that appears to the virtual machine as a physical disk. A virtual disk is typically a copy of one or more file systems stored on a physical disk (or another virtual disk). In conventional systems, the virtual disk typically has a copy of all of the files in a file system. Thus the copy of the file system on a virtual disk may contain more files than are necessary for the virtual machine's intended purpose. Such unnecessary files may include files containing sensitive data such as passwords, financial information, personal information etc.

BRIEF DESCRIPTION OF THE DRAWINGS

For a better understanding of the inventive subject matter, reference may be made to the accompanying drawings in which.

DETAILED DESCRIPTION

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Described herein are systems and methods for creating virtual disks for virtual machines. The virtual disk can be created from marked folders such that files and folders containing sensitive data or data not necessary for the purpose of a virtual machine using the virtual disk can be omitted from the virtual disk.

Figure 1:
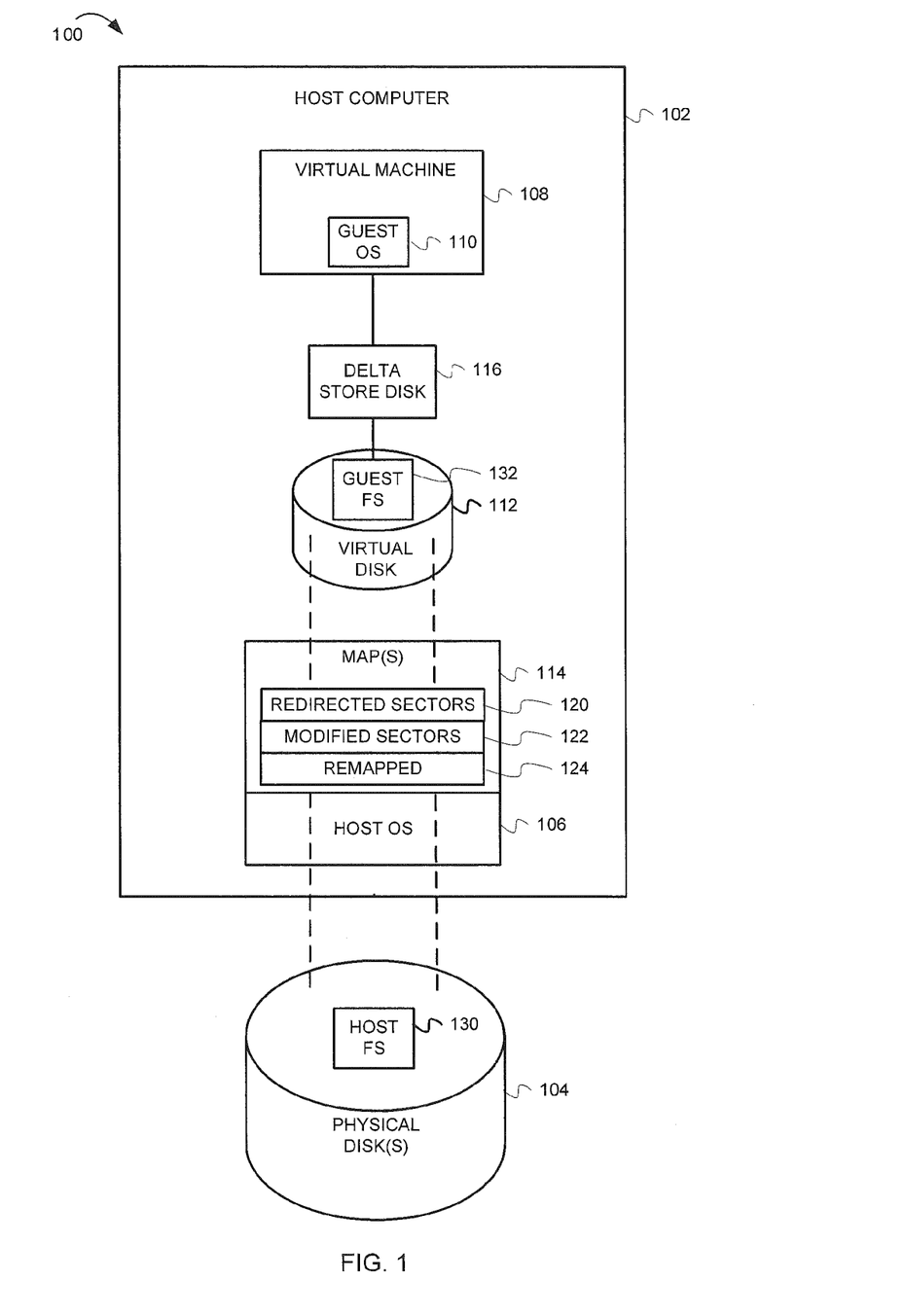
FIG. 1 is a block diagram of a system according to embodiments of the invention.

FIG. 1 is a block diagram of a system 100 according to embodiments of the invention. In some embodiments, system 100 includes host computer 102 coupled to at least one physical disk 104. Host computer 102 may be any type of computer system, including personal computers, server computers, mainframe computers, laptop computers, tablet computers, and other devices such as smart phones, MP3 players, personal digital assistants, etc. Host computer 102 runs a host operating system 106. Host operating system 106 may be any multitasking operating system including various versions of the UNIX, Linux, Windows and mainframe operating systems. The embodiments are not limited to any particular host operating system.

Physical disk 104 may by any type of persistent storage system, including hard drives, optical drives, network attached storage etc. Physical disk may include one or more partitions, volumes etc. Physical disk 104 includes a host file system 130. In some embodiments, the file system may be NTFS (New Technology File System). However the embodiments are not limited to NTFS and other types of file systems may be used and are within the scope of the inventive subject matter.

Host operating system 106 may be configured to implement a virtual machine 108. Virtual machine 108 may execute a guest operating system 110. Guest operating system 110 may be the same type of operating system as host operating system 106 or it may be a different operating system.

Guest operating system 110 and applications running on virtual machine 108 may access virtual disk 112. In some embodiments, virtual disk 112 may be a software implemented disk that includes a guest file system 132. Virtual disk 112 can be a copy of some or all of physical disk 104. Alternatively, virtual disk 112 may map regions of the virtual disk to some or all of disk 104. The contents of virtual disk 112 may be determined as described in detail below with reference to FIGS. 3-5.

Maps 114 describe the mapping of sectors or regions from physical disk 104 to virtual disk 112. In some embodiments, maps 114 include three types of maps to describe the mapping. A first mapping specifies redirected sectors 120. A second mapping specifies modified sectors 122. A third mapping specifies remapped sectors 124. When virtual machine 108 reads or writes a sector from virtual disk 112, it can use the maps to obtain the requested data.

Redirected sectors map 120 comprises a sector mapping for files that exist on host file system 130 and are to be accessible on guest file system 132. In order to make a file visible on guest file system 132 to virtual machine 108 (e.g. C:\Windows\notepad.exe), the system determines from file system data where the file's file system record is stored, and which sectors are occupied by the file. In NTFS embodiments, the system determines where the file's master file table (MFT) record is stored. The sectors are marked as redirected in guest file system 132. Later, when virtual machine 108 wants to read the sectors for the file, redirected sectors map 120 can be read to determine whether or not the read should be redirected to the host file system 130.

Modified sectors map 122 maps sectors on guest file system 132 that have changed as a result of changes to files or folders on guest file system 132. In some embodiments, this map contains a pair of sector number and sector contents. When virtual machine 108 reads a sector that has been changed, this map is used to return the modified sector instead of the host sector. When a new file is created on guest file system 132, a file system entry is created for the file and the sectors associated with the file are indicated as modified sectors in modified sectors map 122. The file system entry is then inserted into a folder (referred to as a parent folder). The sector changes associated with insertion of the file into the parent folder are also saved in modified sectors map 122.

In NTFS embodiments, an MFT record is created for the file and the files sectors are indicated as modified sectors. The MFT record is inserted in a parent folder. The parent folder's $INDEX_ALLOCATION structure is modified to reflect the insertion of the file. The sector changes associated with the changes to the $INDEX_ALLOCATION structure are saved in modified sectors map 122.

Remapped sectors map 124 maps sectors for new files that are created on guest file system 132 that may actually exist at an external location such as a different volume, a different disk or a different network. Sectors for such files are reserved on guest file system 132. When virtual machine 108 reads such sectors, these sectors are read directly from the file stored on the external location. The difference between remapped sectors map 124 and redirected sectors map 120 is that remapped sectors are not stored on physical disk 104, but instead are store at an external location.

Delta store 116 stores changes that are made to the virtual disk 112 that are local to virtual machine 108. In other words, delta store 116 stores data associated with changes that are visible on guest file system 132, but are not made visible on host file system 130.

It will be appreciated by one of skill in the art having the benefit of the disclosure that although one virtual machine, virtual disk and physical disk are illustrated in FIG. 1, a typical computer system can, and typically will, include more than one virtual machine, virtual disk or physical disk. Such configurations are within the scope of the inventive subject matter.

Figure 2:
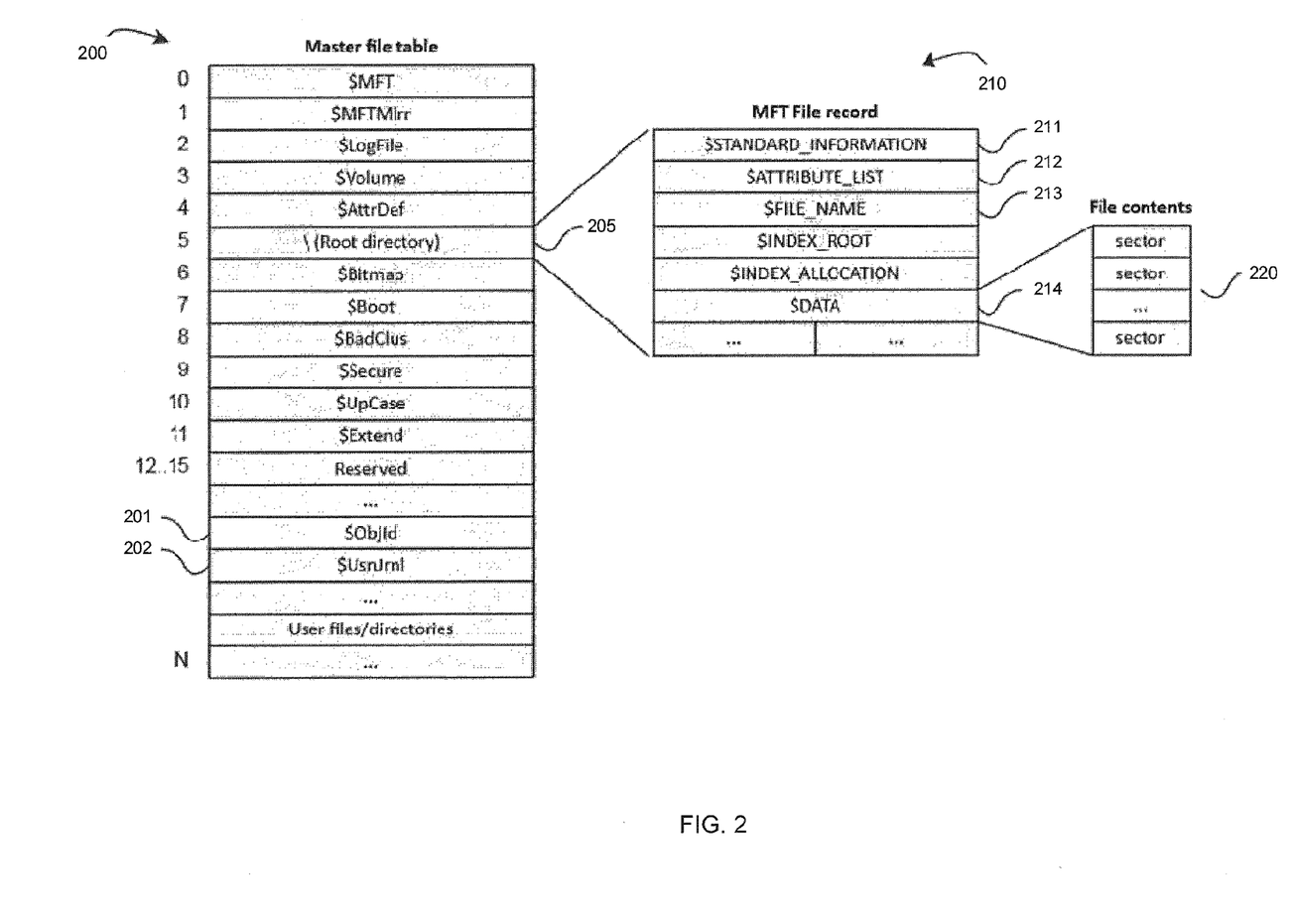
FIG. 2 is a block diagram illustrating data structures for an NTFS file system used in embodiments.

As noted above, some embodiments utilize an NTFS file system. FIG. 2 is a block diagram illustrating data structures used in an NTFS file system. A basic component of the NTFS volume structure is MFT 200. It is implemented as an array of MFT file records. Usually, each MFT file record corresponds to a different file. The first several MFT records are reserved for NTFS itself and their names begin with a dollar sign ($). They describe e.g. volume name ($Volume record), free/occupied sectors on the volume ($Bitmap record), list of object identifiers ($ObjId record), USN database ($UsnJrn1 record), etc. Root directory 205 (also known as "\"; for example, "C:\") contains an index of the files and directories (i.e., MFTs) stored in volume root. MFT file record 210 can have several attributes which describe information about the record. Such attributes may include one or more of the following:

$STANDARD_INFORMATION 211 contains file attributes, time stamps.
$ATTRIBUTE_LIST 212 may be present when all MFT attributes can't fit into one MFT record.
$FILE_NAME 213 contains a file name
$DATA 214 describes which sectors are occupied by a file.

$INDEX_ROOT, $INDEX_ALLOCATION are used for directories and contains a list of nested files for such folders.

Figure 3:
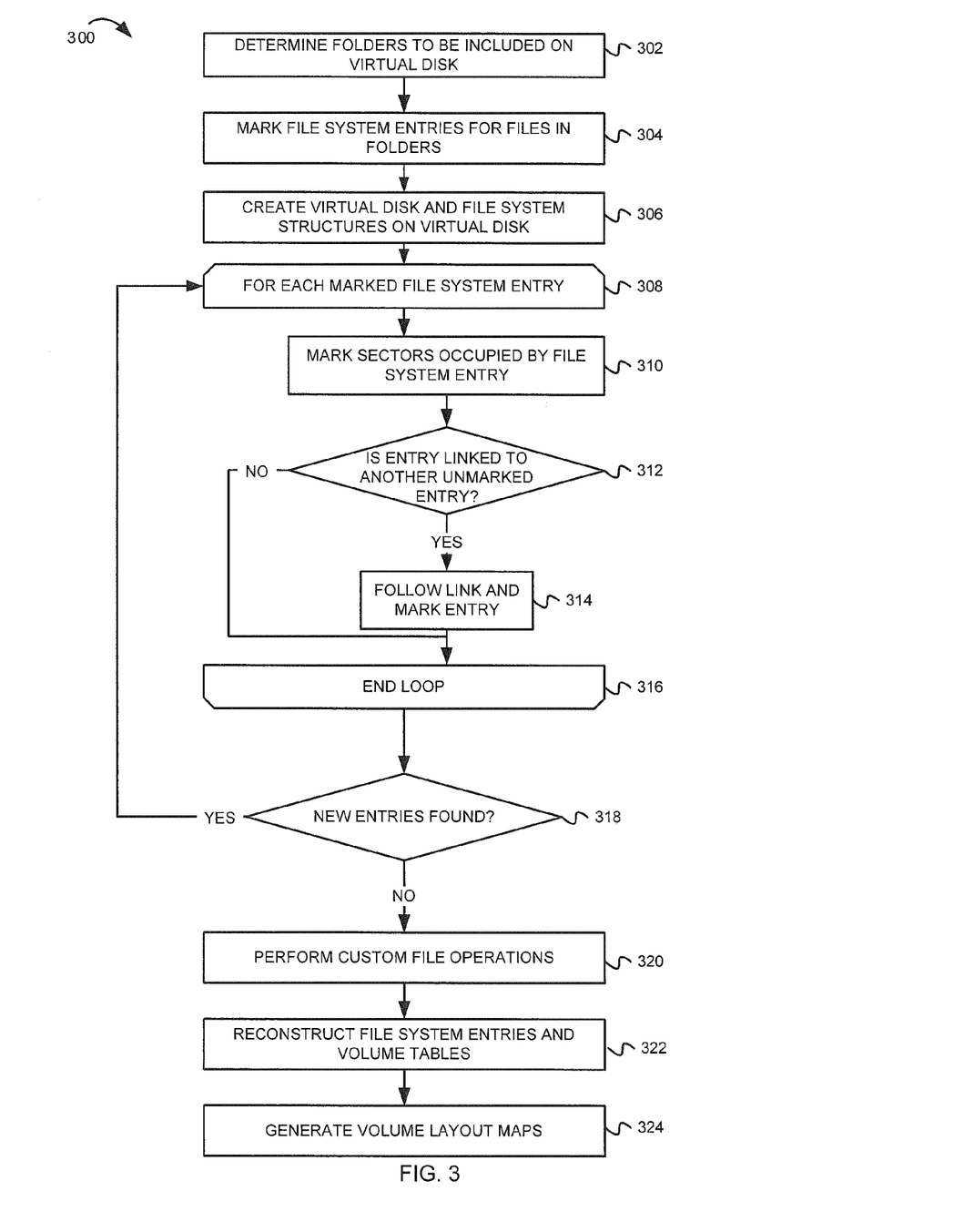
FIG. 3 is a flowchart describing a method for creating a virtual disk according to embodiments.

FIG. 3 is a flowchart describing a method 300 for creating a virtual disk according to embodiments. The method may, in some embodiments, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 3 is inclusive of acts that may be taken by a system 100 executing an example embodiment of the invention.

Method 300 begins at block 302 with determining folders on a source disk (e.g., physical disk 104) that are to be included in a newly created virtual disk (e.g., virtual disk 112). A user or administrator creating a virtual disk may select a subset of folders in a file system for inclusion on the virtual disk. For example, a user or administrator using a Windows based operating system may select the "program files" and "Windows" folders for inclusion. In some embodiments, selecting a folder indicates that the files in the folder are "trusted." Omission of a folder from the selection indicates that the files and sub-folders in the folder are not to be included on the virtual disk. Such files may contain sensitive data or data that is not necessary for the operations of a virtual machine accessing the virtual disk. In some embodiments, the system may automatically select files or folders that are to be excluded from a guest file system based on a characteristic of the file matching or meeting a predetermined or configurable criterion. For example, a file type (e.g., ".log") may potentially include sensitive information and may be excluded from a guest file system 132 created based on a host file system 130. File names, file types, regular expressions, or lists of files to be excluded may be used to automatically exclude files from a guest file system 132.

At block 304, the system marks file system entries for the files in the folders determined at block 302. Marking the file system entries indicates that the file associated with the file system entry is to be included in the virtual disk. In NTFS embodiments, an NTFS file-system structure is implemented as an array of file records in an MFT. A folder is an index of MFT records organized as a B-tree stored in index (INDX) blocks. In such embodiments, the system parses the INDX blocks of the folders marked for inclusion, reads associated MFT records in the INDX blocks, and marks the associated MFT records to be included in the virtual disk.

At block 306, a virtual disk is created and file system structures are initialized on the virtual disk. In NTFS embodiments, MFT tables, USN (Update Sequence Number) journals, reparse points, object identifiers, unicode tables etc. are created and initialized for the virtual disk. Recreating the file system structures is desirable because copying structures from the source disk may result in copying information regarding unmarked MFT records.

Block 308 is the beginning of a loop that walks through each file system entry marked at block 304. In NTFS embodiments, the loop walks through each marked MFT record.

At block 310, the system marks sectors occupied by the currently considered marked file system entry. In NTFS embodiments, the sectors associated with an MFT record may be described in a $DATA substructure of the current MFT record.

At decision block 312, the system determines if the current file system entry is linked to another unmarked file system entry. In NTFS embodiments, a link may be determined from a $ATTRIBUTE_LIST structure in the MFT record. Alternatively, the MFT record may contain multiple $FILE_NAME structures (referred to as "hard links").

If the check at block 312 determines that a linked file system entry is present, then at block 314 the link is followed and the file system entry is marked for inclusion in the virtual disk. Any newly discovered linked file system entries may be examined in a second pass of the loop.

Block 316 is the end of the loop. If further file system entries exist to be processed, then the method returns to block 308 to process the next file system entry.

At block 318, a check is made to determine if new file system entries were discovered during a first pass of the loop. If so, the method returns to block 308 to perform a second pass of the loop to process the linked file system entries.

Figure 4:
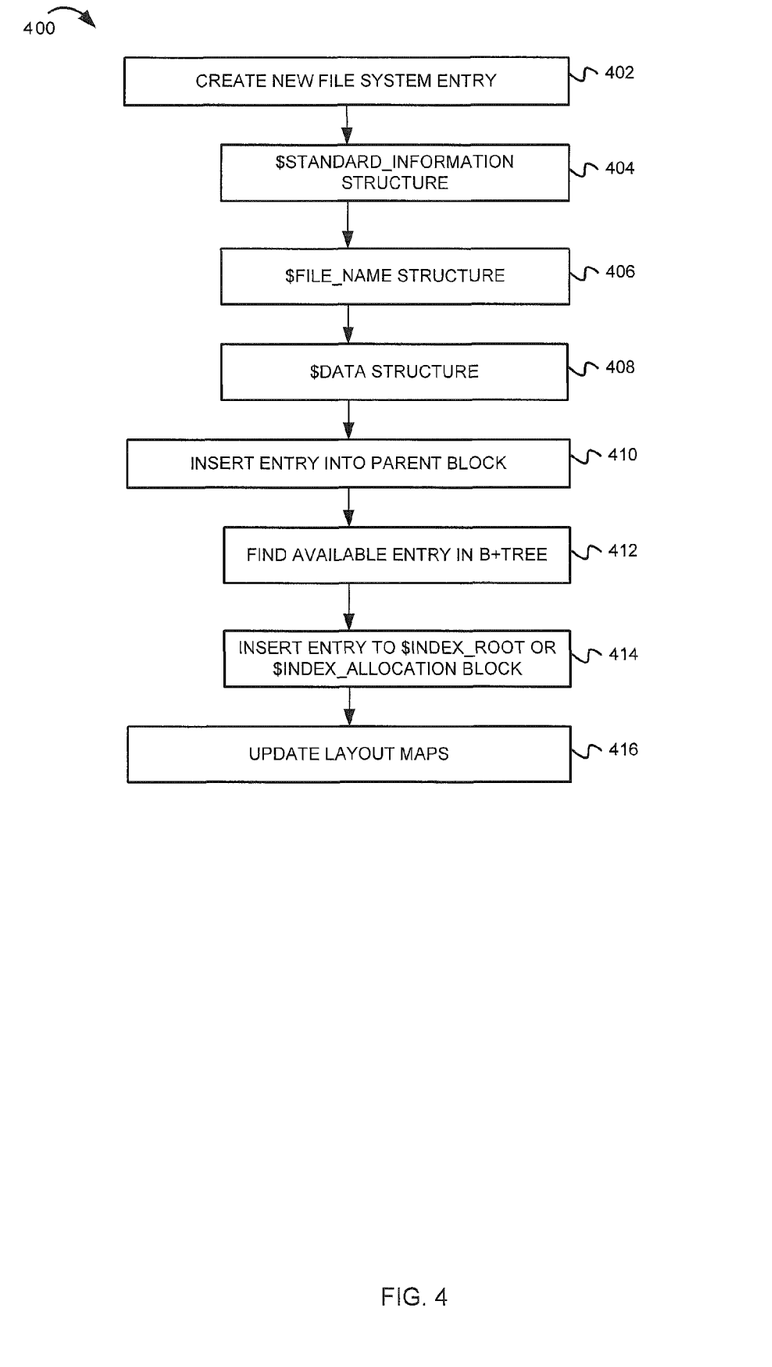
FIG. 4 is a flowchart describing a method for inserting a new file into a virtual disk file system according to embodiments.

After the marked file system entries have been processed, the method proceeds to block 320, where custom file operations may be performed in some embodiments. Such operations may include inserting new files that exist on different sources such as different volumes, networks etc. The sectors associated with such files may be marked for inclusion on the virtual disk. A file identifier may identify the new file in cases where the new file is on the same volume as the source disk. Alternatively, a file path may identify the new file in cases where the new file is on a different source, such as a network attached storage system. FIG. 4 provides further details on the processing performed at block 320.

At block 322, file system entries and tables for the virtual disk are reconstructed based on the marked entries and sectors. In NTFS embodiments, the MFT and $Bitmap tables can be reconstructed to reflect changes in the guest file system 132.

At block 324, the method generates volume layout maps (e.g., maps 114) for the virtual disk. As noted above, the layout maps can include maps for redirected sectors, modified sectors, and remapped sectors.

FIG. 4 is a flowchart describing a method 400 for inserting a new file into a virtual disk file system according to embodiments. Method 400 is described in terms of NTFS file system operations. Those of skill in the art having the benefit of the disclosure will appreciate that the operations described in method 400 may be applied to other file system types. Method 400 begins at block 402 with creating a new MFT entry in the virtual disk file system. Operations 404-408 are executed to create the new MFT entry.

At block 404, a $STANDARD_INFORMATION structure is populated for the newly created MFT record. The $STANDARD_INFORMATION structure includes file time information (e.g., create, modify, access date and time), file access permissions, file ownership information etc.

At block 406, a $FILE_NAME structure is populated for the newly created MFT record. The $FILE_NAME structure can include a text string for the name of the file and a reference to the parent folder for the file.

At block 408, a $DATA structure is populated for the newly created MFT record. The $DATA structure contains the data for the file.

At block 410, the newly created MFT entry is inserted into the parent INDX block to link the MFT entry with a folder. Operations 412 and 414 are executed to insert the MFT entry into the parent INDX block.

At block 412, the method finds a new place in the sorted B+tree to store the newly created MFT entry.

At block 414, the method inserts the newly created MFT entry into $INDEX_ROOT at $INDEX_ALLOCATION block depending on the size of the folder the newly created MFT entry is inserted into.

At block 416, the layout maps 114 may be modified according to the changes resulting from the execution of method 400.

Figure 5:
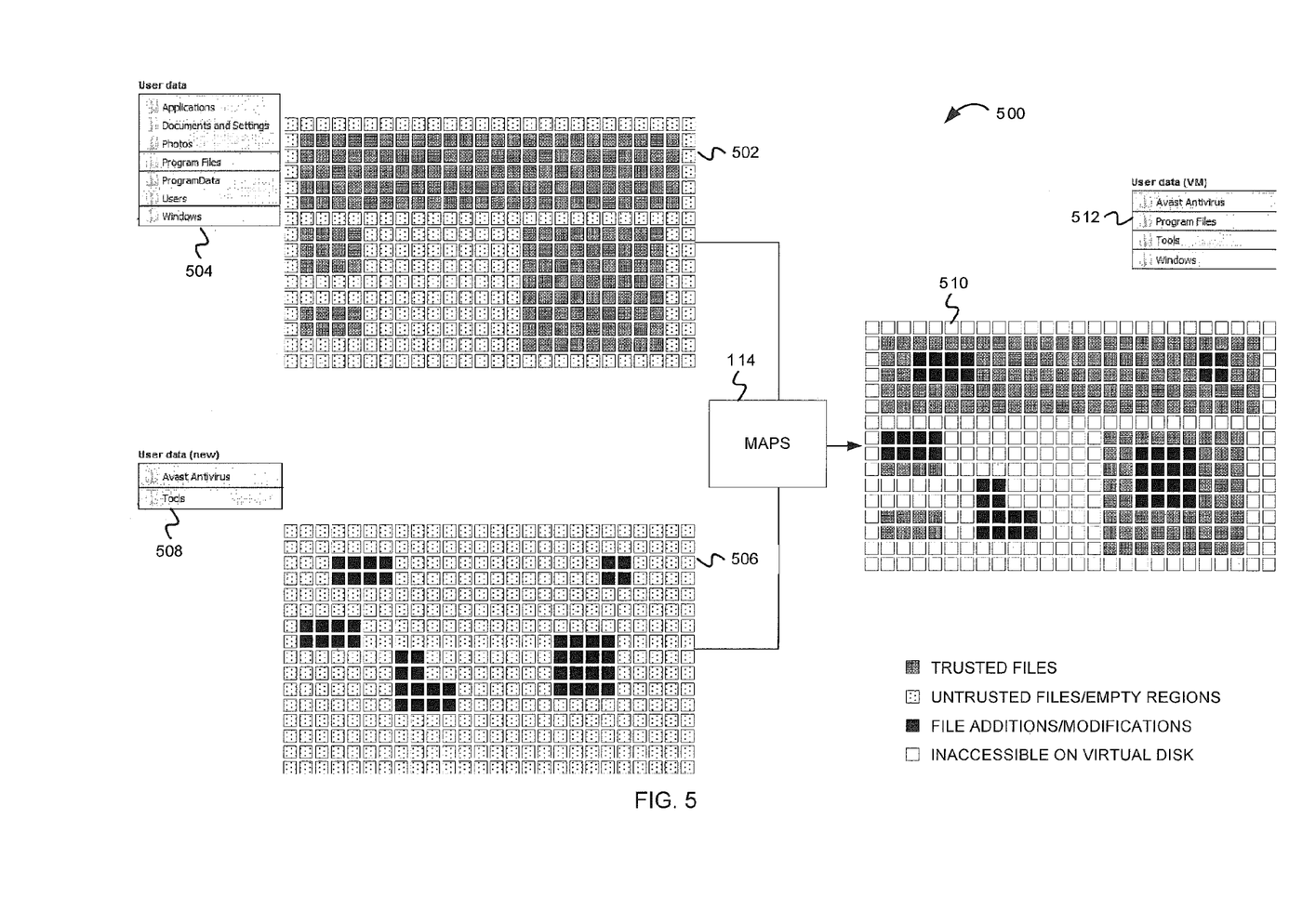
FIG. 5 is a block diagram illustrating an example layout of a virtual disk created according to embodiments.

FIG. 5 is a block diagram illustrating an example layout of a virtual disk created according to embodiments. Region map 502 is an example map that represents regions of a physical disk (e.g., physical disk 104). A folder list 504 illustrates folders on the physical disk. Two folders are shaded ("program files" and "Windows") in folder list 504. In the example illustrated in FIG. 5, these two folders have been designated as trusted. The gray shaded blocks in region map 502 represents disk regions (i.e., sectors) associated with the designated trusted files and folders. The remaining crosshatched areas of region map 502 represent either regions of the physical disk that are unused or associated with untrusted files.

Region map 506 is an example map that represents regions of the physical disk that have been changed since the creation of a virtual disk based on physical disk 104. The black areas in region map 506 represent changes regions of the disk due to file creation or modification of trusted files. In the example illustrated in FIG. 5, the region map is changed due to the addition of folders in folder list 508 to the virtual disk.

Region map 510 is an example map that illustrates the operation of methods 300 that creates the virtual disk and method 400 that performs custom operations such as file creation or modification of trusted files. The changes in trusted files and folders in the file system on the physical disk are merged as illustrated in the example region map 510. Blank areas of region map 510 are inaccessible to a virtual machine using the virtual disk represented by region map 510. These blank areas represent regions associated with untrusted files and folders. Folder list 512 indicates the folders on the virtual disk and includes the selected folders from folder list 504 and the newly added folders in folder list 508.

Various embodiments for the above described systems and methods can provide advantages over tradition methods for creating virtual disks. For example, the operating system stored on a virtual disk for a virtual machine can be minimal, i.e., without software that is not necessary for the virtual machines purpose. The virtual disk may contain clean (e.g., trusted or approved) files or used defined files (e.g., new/modified files). Further, the virtual disk for the virtual machine can be created such that it does not include sensitive data such as password data, financial data, or other sensitive personal or proprietary information. Additionally, creation of a virtual disk may take less time than traditional methods. Finally, the output layout file (i.e., maps 114) for the virtual disk may be small (e.g., less than one megabyte).

The following examples illustrate the operation of the above-described systems and methods in an NTFS environment.

Example 1 Virtual Disk Structure

Assume that a Windows folder on a host file system 130 is to be accessible on virtual machine 108. A main NTFS structure 200 (including records 0-15) is created on guest file system 132. Various NTFS structures created on guest file system 110 remain the same (e.g. $Volume—volume name, $BadClus—list of bad volume clusters, $UpCase—uppercase character mapping) on guest file system 132. These structures, namely their sectors, will be marked as redirected and appear in redirected sectors map 120. However, some structures must be modified (e.g. $ObjId 201 contains list of file identifiers on host file system 130 that may not exist on guest file system 132, therefore such entries are removed and do not appear in guest file system 132. Similarly, $UsnJrn1 202 records file changes made on host file system 130 when a new file is created, deleted, changed, etc. Therefore such entries are also removed from the NTFS structure 200 on guest file system 132. In some embodiments, these changes, namely their sector contents, will be stored into modified sectors map 122. Next, the files and folders in the Windows folder are processed.

The system finds the MFT entry for Windows folder and marks it as redirected (because it exists on host file system 130). Additionally, the MFT attributes for the Windows folder are read and marked as redirected.

Since the Windows folder is a folder, it contains $INDEX_ROOT and $INDEX_ATTRIBUTE attributes in MFT file record 210 which link all nested files in the Windows folder. The system walks through this list and all files appearing in the list are marked as redirected (namely, the file's MFT and sectors 220 stored in MFT $DATA 214 attribute).

NTFS $Bitmap contains a list of sectors which are occupied on the volume. Since guest file system 132 occupies only a subset of sectors on host file system 130, the $Bitmap list on guest file system 132 can be modified to reflect the changes. These changes will be written to modified sectors map 122.

As can be seen from the above, in some embodiments, a whole virtual disk structure can be described using redirected sectors map 120 and modified sectors map 122.

Example 2 Virtual Disk Structure with Additional File Operations

It is usually the case that some additional file operations on guest file system 132 will be performed as part of creating a virtual disk 112. For example, some tools may be preinstalled, Windows registry settings replaced, sensitive files may be deleted from Windows folders (e.g., logs, etc.). Guest file system 132 can be reconstructed as described above in FIGS. 2-5 and in Example 1. One example involves creating a new file on a guest file system 132 that is being reconstructed from a host file system 130. When creating a new file, an MFT structure is created for the file and marked as modified. A file header for the file on the host file system 130 is cloned as file header on the guest file system 132. Additionally, the system reserves sectors for this file and marks the sectors as redirected to corresponding sectors containing the file content of the external file on the host file system 130. Thus the contents of the file on the guest file system 132 actually resides in the sectors of the external file. Upon a read of the file on the guest file system 132, the file read operation is redirected from the guest file to the host file having the content. The guest read operation thus actually receives the data from the host file system. From the point of the of the source of the read request on the guest operating system 110, it appears that the data is coming from the file in the guest file system 132. The source in the guest operating system 110 is not aware (nor does it need to be aware) that the data actually resides on the host file system 130. In the case of replaced registry files, these files are already exist on guest file system, hence it is not necessary to create their MFTs. However, the system redirects their MFT $Data sectors to external files.

As can be seen from this example, in some embodiments a whole virtual disk 112 structure can be described by redirected sectors map 120, modified sectors map 122 and remapped sectors map 124.

Example 3 Use of Virtual Disk Structure

One of the many applications of virtual disk technology is in the area of computer security and anti-virus protection. Examples of such products include the Avast! series of products available from Avast Software. In some embodiments, a computer security product can cause the creation of a virtual machine and a virtual disk that maps the Windows folder to virtual machine, removes sensitive files, installs additional tools (for malware analysis), or installs a secured web browser. The computer security software can also replace Windows registry settings with a new user's settings, for example, the user's own user profile from a host machine. Services can be disabled, sensitive settings removed, etc in the guest environment. New registry settings in the virtual machine can be desirable, because when the virtual machine's Windows OS is starting, it is typically booted directly into the user profile. This is desirable because the user's default profile could be protected by a password that isn't known to the security product, or it may link to non-exist files on guest file system 132, etc. When Windows OS on the virtual machine 108 writes data to virtual disk 112, the data can be written to delta store disk 116 (FIG. 1).

As can be seen from the above, a whole virtual disk structure can be described by redirected sectors map 120, modified sectors map 122 and remapped sectors map 124.

Figure 6:
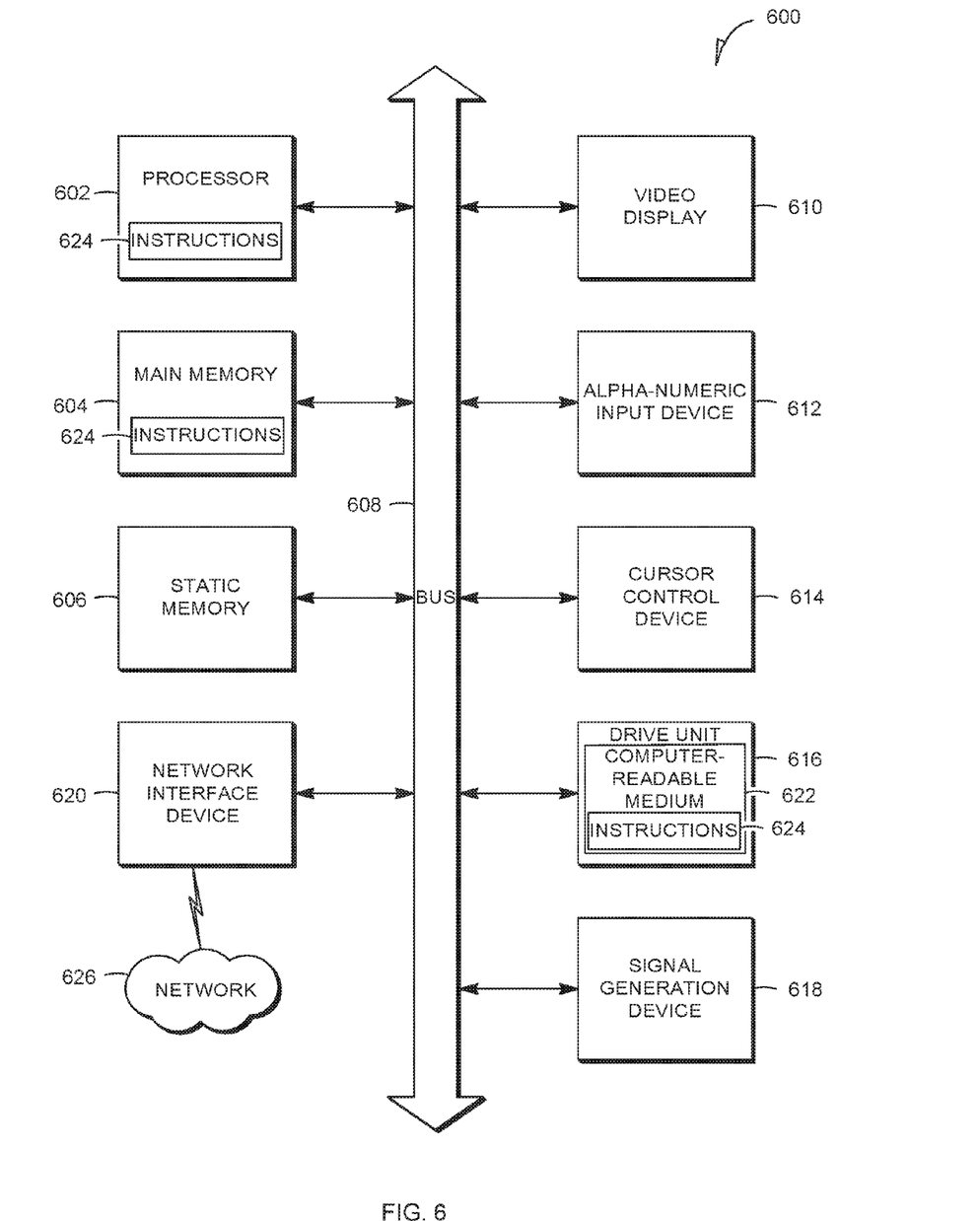
FIG. 6 is a block diagram of an example embodiment of a computer system upon which embodiments of the inventive subject matter can execute.

FIG. 6 is a block diagram of an example embodiment of a computer system 600 upon which embodiments of the inventive subject matter can execute. The description of FIG. 6 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 6 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to both servers and/or remote clients.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network 626 using a signal transmission medium via the network interface device 620 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method comprising:
   receiving a request to create a virtual disk;
   in response to receiving the request, reading file system entries from a file system on a source disk, the file system having a plurality of file system entries indicating files and folders within the file system;
   determining by one or more processors whether or not a file system entry for a folder is marked for inclusion on the virtual disk; and
   in response to determining that the folder is marked for inclusion on the virtual disk, creating file system entries on the virtual disk for the folder and the files within the folder and including data for the folder and the files within the folder on the virtual disk.

2. The method of claim 1, wherein including data for the folder and the files within the folder on the virtual disk comprises creating a mapping for the data for the folder and the files within the folder from the virtual disk to the source disk.

3. The method of claim 2, wherein said creating the mapping comprises creating one or more of a first mapping comprising redirected sectors, a second mapping comprising modified sectors or a third mapping comprising remapped sectors.

4. The method of claim 1, further comprising:
   receiving an indication that a folder is to be included on the virtual disk; and
   marking a file system entry associated with the folder to indicate that the folder is to be included on the virtual disk.

5. The method of claim 1, wherein files and folders not marked for inclusion on the virtual disk are not accessible by a virtual machine accessing the virtual disk.

6. The method of claim 1, further comprising determining to include a file in a folder that is not marked for inclusion on the virtual disk in response to determining that the file is linked to a file in a folder marked for inclusion on the virtual disk.

7. The method of claim 1, further comprising excluding from the virtual disk a file from a folder marked for inclusion in the virtual disk.

8. A machine-readable storage medium, the machine-readable storage medium having instructions stored thereon for causing one or more processors to perform operations comprising:
   receiving a request to create a virtual disk;
   in response to receiving the request, reading file system entries from a file system on a source disk, the file system having a plurality of file system entries indicating files and folders within the file system;
   determining whether or not a file system entry for a folder is marked for inclusion on the virtual disk; and
   in response to determining that the folder is marked for inclusion on the virtual disk, creating file system entries on the virtual disk for the folder and the files within the folder and including data for the folder and the files within the folder on the virtual disk.

9. The machine-readable storage medium of claim 8, wherein including data for the folder and the files within the folder on the virtual disk comprises creating a mapping for the data for the folder and the files within the folder from the virtual disk to the source disk.

10. The machine-readable storage medium of claim 9, wherein the creating the mapping comprises creating one or more of a first mapping comprising redirected sectors, a second mapping comprising modified sectors or a third mapping comprising remapped sectors.

11. The machine-readable storage medium of claim 8, wherein the operations further comprise:
    receiving an indication that a folder is to be included on the virtual disk; and
    marking a file system entry associated with the folder to indicate that the folder is to be included on the virtual disk.

12. The machine-readable storage medium of claim 8, wherein files and folders not marked for inclusion on the virtual disk are not accessible by a virtual machine accessing the virtual disk.

13. The machine-readable storage medium of claim 8, wherein the operations further include determining to include a file in a folder that is not marked for inclusion on the virtual disk in response to determining that the file is linked to a file in a folder marked for inclusion on the virtual disk.

14. The machine-readable storage medium of claim 8, wherein the operations further include excluding from the virtual disk a file from a folder marked for inclusion in the virtual disk.

15. A system comprising:
    at least one processor;
    a memory coupled to the at least one processor, the memory storing instructions that when executed by the at least one processor cause the at least one processor to perform operations comprising:
    receiving a request to create a virtual disk;
    in response to receiving the request, reading file system entries from a file system on a source disk, the file system having a plurality of file system entries indicating files and folders within the file system;

determining whether or not a file system entry for a folder is marked for inclusion on the virtual disk; and in response to determining that the folder is marked for inclusion on the virtual disk, creating file system entries on the virtual disk for the folder and the files within the folder and including data for the folder and the files within the folder on the virtual disk.

16. The system of claim 15, wherein including data for the folder and the files within the folder on the virtual disk comprises creating a mapping for the data for the folder and the files within the folder from the virtual disk to the source disk.

17. The system of claim 16, wherein the creating the mapping comprises creating one or more of a first mapping comprising redirected sectors, a second mapping comprising modified sectors or a third mapping comprising remapped sectors.

18. The system of claim 15, wherein the operations further comprise:

receiving an indication that a folder is to be included on the virtual disk; and marking a file system entry associated with the folder to indicate that the folder is to be included on the virtual disk.

19. The system of claim 15, wherein files and folders not marked for inclusion on the virtual disk are not accessible by a virtual machine accessing the virtual disk.

20. The system of claim 15, further comprising determining to include a file in a folder that is not marked for inclusion on the virtual disk in response to determining that the file is linked to a file in a folder marked for inclusion on the virtual disk.

21. The system of claim 15, further comprising excluding from the virtual disk a file from a folder marked for inclusion in the virtual disk.

22. The system of claim 15, wherein the file system comprises a file system conforming to a version of a New Technology File System (NTFS).

* * * * *